(12) United States Patent
Ye

(10) Patent No.: US 10,822,283 B2
(45) Date of Patent: Nov. 3, 2020

(54) POROUS MATERIAL AND PREPARATION METHOD THEREOF

(71) Applicant: CHONGQING RUZER PHARMACEUTICAL CO., LTD, Chongqing (CN)

(72) Inventor: Lei Ye, Chongqing (CN)

(73) Assignee: CHONGQING RUZER PHARMACEUTICAL CO., LTD., Chongqing (CN)

( * ) Notice: Subject to any disclaimer, the term of this patent is extended or adjusted under 35 U.S.C. 154(b) by 154 days.

(21) Appl. No.: 16/075,673

(22) PCT Filed: Oct. 18, 2016

(86) PCT No.: PCT/CN2016/102454
§ 371 (c)(1),
(2) Date: Aug. 6, 2018

(87) PCT Pub. No.: WO2017/076163
PCT Pub. Date: May 11, 2017

(65) Prior Publication Data
US 2019/0112237 A1    Apr. 18, 2019

(30) Foreign Application Priority Data

Nov. 6, 2015  (CN) .......................... 2015 1 0749513

(51) Int. Cl.
*C04B 38/00*    (2006.01)
*C04B 35/10*    (2006.01)
(Continued)

(52) U.S. Cl.
CPC ........... *C04B 38/009* (2013.01); *B01J 21/063* (2013.01); *B01J 35/002* (2013.01); *B01J 35/04* (2013.01);
(Continued)

(58) Field of Classification Search
CPC ........................... C04B 35/0615; C04B 35/08
See application file for complete search history.

(56) References Cited

U.S. PATENT DOCUMENTS 8,318,191 B2 * 11/2012 Yun .......................... A61F 2/28
423/301
2010/0010513 A1 * 1/2010 Yun .......................... A61F 2/28
606/151

FOREIGN PATENT DOCUMENTS

CN    102101785 A    6/2011
CN    102557716 A    7/2012
(Continued)

*Primary Examiner* — Karl E Group
(74) *Attorney, Agent, or Firm* — Knobbe, Martens, Olson & Bear, LLP

(57) ABSTRACT

A porous material having a hierarchical pore structure, wherein a size and shape of interconnection parts of at least one level pore cavities is consistent with a size and shape of interconnection parts between the level pore cavities and the previous level pore cavities thereof, and an average value of equivalent diameters of the interconnection parts is larger than 45% of that of a diameter of small pore cavities of two adjacent pore cavities of the interconnection parts. The method for preparing the porous material includes: mixing a raw material powder with a pore-forming agent used for preparing the smallest level pores to formulate a slurry; uniformly filling the slurry into a polymeric material frame, and drying and crushing to form mixed grains; then uniformly mixing the mixed grains with the pore-forming agent used for preparing the upper-level pore cavities, forming a compact green body and sintering.

20 Claims, 2 Drawing Sheets

(51) Int. Cl.
 C04B 35/80 (2006.01)
 C04B 38/06 (2006.01)
 B01J 37/00 (2006.01)
 C04B 35/46 (2006.01)
 B01J 35/04 (2006.01)
 C04B 35/495 (2006.01)
 B01J 35/00 (2006.01)
 B01J 21/06 (2006.01)
 C04B 38/10 (2006.01)
 C04B 111/00 (2006.01)
 C04B 35/117 (2006.01)
 C04B 41/48 (2006.01)
(52) U.S. Cl.
 CPC ........... *B01J 37/0018* (2013.01); *C04B 35/10* (2013.01); *C04B 35/46* (2013.01); *C04B 35/495* (2013.01); *C04B 35/80* (2013.01); *C04B 38/0655* (2013.01); *C04B 38/10* (2013.01); *C04B 35/117* (2013.01); *C04B 41/4826* (2013.01); *C04B 2111/0081* (2013.01); *C04B 2111/00793* (2013.01); *C04B 2111/00827* (2013.01); *C04B 2111/00836* (2013.01); *C04B 2235/3217* (2013.01); *C04B 2235/3232* (2013.01); *C04B 2235/3251* (2013.01); *C04B 2235/52* (2013.01); *C04B 2235/6581* (2013.01); *C04B 2235/94* (2013.01)

(56) References Cited

FOREIGN PATENT DOCUMENTS

| CN | 102796907 A | 11/2012 |
| CN | 103230621 | 8/2013 |

\* cited by examiner

POROUS MATERIAL AND PREPARATION METHOD THEREOF

CROSS REFERENCE TO RELATED APPLICATIONS

This application is the national phase entry of International Application No. PCT/CN2016/102454, filed on Oct. 18, 2016, which is based upon and claims priority to Chinese Patent Application No. 201510749513.7, filed on Nov. 6, 2015, the entire contents of which are incorporated herein by reference.

TECHNICAL FIELD

The present invention relates to a porous material, specifically relates to a porous material having a structure with multilevel pores and a preparation method thereof.

BACKGROUND

Porous materials are not only structural materials, but more importantly, used as functional materials, which have been widely used in the field of energy and environmental protection, petrochemical, metallurgical machinery, national defense and military, nuclear technology, bio-pharmaceutical, medical equipment, etc. For example, porous materials can be used to filter and separate gases or liquids to achieve purification and separation of the medium; porous ceramics can be used as a catalyst carrier to promote reactions; porous materials such as porous titanium, porous tantalum, porous hydroxyapatite, etc. can be used as biological materials, such as artificial bones, teeth, etc.; porous materials can be used in high efficiency heat exchangers; porous materials such as nickel foam and copper foam can be used as excellent electrode materials for various batteries, fuel cells and solar cells; porous materials can be used for energy and shock absorption, noise reduction, for example, used for anti-shocks in automobiles, and used as a filter. In the past ten years, a new type of material in porous materials—a hierarchical porous material, that is, material graded by pore size, has become a topic of hot research due to its unique properties, relating to many fields such as biotechnology, biomedicine, catalysis, separation, energy, optics, etc.

In many applications of the porous material, not only the pore size of the porous material is required to be uniform, but also the pores are needed to be sufficiently interconnected and uniform. At present, many porous materials have interconnection parts with random structures, and porous structures thereof have not been reasonably designed and effectively controlled; moreover, for hierarchical porous materials, it is more difficult to achieve effective control of the interconnection part due to the complexity of the preparation method.

SUMMARY

An objective of the present invention is to provide a porous material having a structure with multilevel pores that has a controllable structure and can accurately realize a specific function.

Another objective of the present invention is to provide a method for preparing the porous material having the structure with multilevel pores that has a uniform controllable interconnection part and good connectivity.

For porous materials, the interconnection between the pore cavities is achieved through the interconnection part, and it will affect the performance index of the porous materials if the structural design of the interconnection part between the pore cavities of the existing porous materials is unreasonable or the interconnection part structure is random, thereby affecting the porous material to fully and accurately perform its specific functions. For example, for filter materials, if the size of the interconnection part is not uniform, it is difficult to control the particle size of the filtered medium, and it affects the filtration efficiency.

Inventor believes that in order to make the interconnection parts between the pore cavities and the pore cavities of the hierarchical porous material uniform and controllable and accurately perform a specific function, it is necessary not only to make the pore cavities uniform in size, but also to have uniform interconnection parts. These need to control the shape and structure of the pore cavity, so that the size and shape of the interconnection parts are uniform as well. As for the preparation method, it is an effective way to use a pore-forming agent having a uniform size and shape as a pore-forming agent for the interconnection part.

The objectives of the present invention are achieved by the following technical scheme:

A porous material includes a material body, wherein the material body is composed of pore cavities and cavity walls surrounding to form the pore cavities, and the pore cavities are graded by pore size of the materials, and lower-level pore cavities are arranged on cavity walls of upper-level pore cavities formed by surrounding a three-dimensional space; the pore cavities at same level are interconnected with each other, and the pore cavities at different levels are also interconnected with each other, wherein a size and shape of a interconnection part between at least one level of pore cavities is consistent with a size and shape of a interconnection part between the level of pore cavities and the previous level of pore cavities, and an average value of an equivalent diameter of the interconnection parts is larger than 45% of a diameter of the small pore cavity of two adjacent pore cavities of the interconnection parts, wherein the equivalent diameter refers to a diameter of a circle that equals to an area of a cross section of a connecting rod when the cross section of the connecting rod is a non-circular cross section.

Further, porous materials of each level in the material body form a continuous structure, so that the porous material of each level can effectively exist as one independent level porous material in the material body to play a unique role of pores of this level.

Further, a maximum outer boundary of porous material of each level is equivalent to a space boundary of an entire material body, so that the porous material of each level plays a role of porous material of this size in the space of the entire material body.

Further, the porous material of each level, in the material body, has its own physicochemical properties, so that the porous material of each level has different functions and plays different roles, therefore, the materials as a whole has multiple functions, thereby meeting various needs.

Further, pore cavities and interconnection parts in the porous material of each level are uniform in size and evenly distributed in the porous material of this level, so that material properties are evenly distributed in the material body.

Another objective of the present invention is achieved as follows. A method of preparing a porous material including the steps of:

(1) material preparation

Mixing raw material powder with a pore-forming agent used for preparing the smallest level of pore cavities, preparing a slurry;

uniformly filling the slurry into a polymer material support to form a green body; and drying and crushing the green body to form mixed grains containing the raw material, the pore-forming agent and a material of the polymer material support;

(2) uniformly mixing the mixed grains obtained as described above with a pore-forming agent used for preparing an upper-level pore cavities larger than the smallest level pore cavities of the porous material to form a compact green body;

(3) vacuum sintering the compact green body; performing a conventional subsequent treatment on the sintered green body according to a raw material process of the porous material to obtain a porous material.

The structure of the pore-forming agent particles of at least one level of pore cavities connected by a connecting rod adopts the following manner: there are at least three connecting rods of the same size and shape on any one of the pore-forming agent particles, wherein at least two connecting rods are respectively connected with other pore-forming agent particles, the diameter of the connecting rods is larger than 45% of the diameter of the pore-forming agent particle, and the length of the connecting rods is more than 10% of the diameter of the pore-forming agent particle. The connecting rods can be used as pore-forming agent to form interconnection parts between the pore cavities, and the amount of the interconnection parts is large to ensure the connectivity and make the interconnection parts uniform and controllable.

Further, the structure of the pore-forming agent particles of at least one level of pore cavities connected by the connecting rods is in the following manner: at least four pore-forming agent particles are connected by the connecting rods to form a three-dimensional integral structure, thereby facilitating three-dimensional connection.

Further, the shape of pore-forming agent particle is a polyhedron with at least 5 surfaces or a spherical having at least two spherical segments. The area of any surface of the polyhedron or the area of the spherical segment is equivalent to the cross-sectional area of the connecting rod perpendicular to the axial direction. Therefore, the mixed grains are easily in contact with the connection rods and the pore-forming agent particles during sintering, which is beneficial to the connection.

Further, before preparing the compact green body, the mixed grains are uniformly mixed with a pore-forming agent used for preparing pore cavities one level larger than the smallest level pore cavities of the porous materials to obtain a mixture, and the mixture is uniformly poured into the polymer material support; the pore size of the polymer material support is larger than the particle size of the mixed grains and the particle size of the pore-forming agent; the edge of the polymeric material frame is used as a pore-forming agent of pore cavities two levels larger than the smallest level pore cavities of the porous materials. Thus, after vacuum sintering, a hierarchical porous material with tertiary pores can be prepared; in a similar way, a porous material with multilevel pores can be prepared.

Further, the pores of the polymer material support are three-dimensionally interconnected thus preparing the three-dimensionally interconnected hierarchical porous material.

The beneficial effects of the present invention:

(1) The present invention provides a material with hierarchical pore structure. The shape and structure of the interconnection parts between the pore cavities are reasonable, which can not only effectively control the shape and structure of the pore cavities to make the interconnection parts between the pore cavities uniform, but also control the interconnection parts to have a certain size to ensure the connection, and the material helps to accurately achieve its specific function. For example, for a micro-nano titanium dioxide photocatalytic material with secondary pores of this structure, when large pore cavities and the interconnection parts are controlled, more light can be uniformly introduced into the interior of photocatalytic material, thereby significantly improving the photocatalytic activity thereof. For an alumina with secondary pores of this structure, when the large pore cavities and the interconnection parts are controlled and used as a filter material, the upper limit value of the filtered material particles can be effectively controlled by the diameters of the interconnection parts and improve filtration efficiency.

(2) The porous material provided by the present invention realizes three-dimensional connection and has excellent connection.

(3) In the porous material, each same size of porous material is a continuous structure, and has its own physical and chemical properties, so that the porous material can meet various functional requirements.

(4) The pore cavities at each level and the interconnection parts thereof of the porous material are uniform in size and evenly distributed in the material of the level, so that the material properties are evenly distributed.

(5) The present invention provides a method for preparing a porous material, which can prepare a hierarchical pore structure, can effectively control the structure of the interconnection parts, and the method is effective and it is easy to adjust and control the parameters.

BRIEF DESCRIPTION OF THE DRAWINGS

The present invention will be further described in combination with drawings and embodiments.

DETAILED DESCRIPTION OF THE EMBODIMENTS

The embodiments of the present invention are described below with reference to the drawings. The embodiments are based on the technical scheme of the present invention, and detailed embodiments and specific operation procedures are given, but the protection scope of the present invention is not limited to the embodiments described below.

Figure 1:
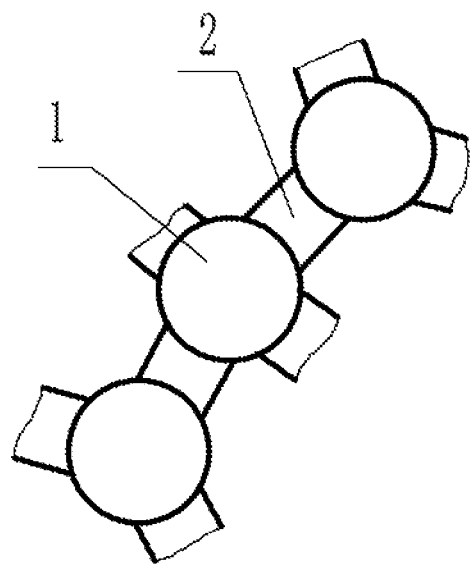
FIG. 1 is a structural diagram of the pore-forming agent of the present invention.

Referring to FIG. 1, 1 is a pore-forming agent particle, 2 is a connecting rod, and the pore-forming agent particle 1 is connected to other particles through the connecting rod 2.

Figure 2:
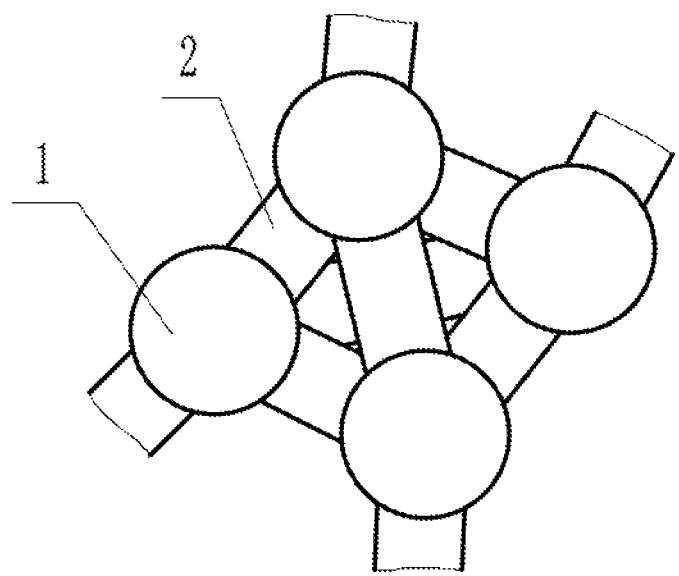
FIG. 2 is a structural diagram of the three-dimensional integral structure formed by connecting the pore-forming agent particles through connecting rods.

Referring to FIG. 2, 1 is a pore-forming agent particle, 2 is a connecting rod, and four pore-forming agent particles are connected by the connecting rods to form a three-dimensional integral structure.

Figure 3:
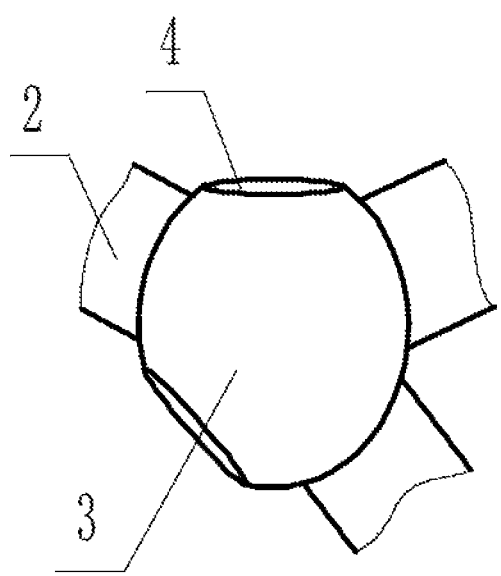
FIG. 3 is a schematic diagram of a spherical pore-forming agent particle having spherical segments.

Referring to FIG. 3, 3 is a spherical pore-forming agent particle having spherical segments, 2 is a connecting rod, and 4 is a spherical segment on the spherical pore-forming agent particle.

Embodiments of the invention are given in detail below:

Embodiment 1

The porous material of the present embodiment is a porous titanium dioxide with a secondary pore structure. The cavity walls of large pore cavities with uniform distribution and mutual connection are provided with small pore cavities with uniform distribution and mutual connection, and different levels of pore cavities are also interconnected with each other, and the interconnection is three-dimensional interconnection. The porous material of each level is a continuous structure, and the maximum outer boundary of the porous material of each level is equivalent to a space boundary of an entire material body. The large pore cavities have an average pore size of 50 μm and the small pore cavities have an average pore size of 17 nm.

The preparation method is as follows:

(1) Material preparation

A titanium dioxide powder with an average particle size of 7 nm is used as a raw material, and ethyl cellulose with an average particle size of 25 nm is used as a pore-forming agent for small pore cavities, and a starch with an average particle size of 25 nm is used as a binder. The titanium dioxide powder, the ethyl cellulose, the starch and the distilled water are formulated into a slurry according to a volume ratio of 1:3:1:12.

The polyester foam with a pore size of 500 μm to 860 μm is used. The slurry is uniformly filled into the polyester foam by a foam impregnation method to form a green body, and the green body is dried and crushed to obtain the mixed grains with a grain size of 5 μm to 8 μm containing the raw material, the pore-forming agent and the polyester foam.

(2) A pore-forming agent having a structure as shown in FIG. 1 is prepared from polyethylene. A pore-forming agent unit is composed of three pore-forming agent particles, and the particles are spherical with a diameter of 60 μm. Each pore-forming particle is provided with four connecting rods having a cylindrical shape, a diameter of 30 μm and a length of 7 μm, and the three pore-forming agent particles are formed into a whole by two connecting rods. The pore-forming agent was uniformly mixed with the mixed grains according to a volume ratio of 3.5:1 and placed in a closed mould to be pressed into a compact green body.

(3) The compact green body is vacuum sintered, and the sintered green body is subjected to a conventional subsequent treatment according to a titanium dioxide process to obtain porous titanium dioxide with secondary pores.

The sample of the porous titanium dioxide with secondary pores prepared as described above was prepared into a plane sheet having a size of 20 mm×20 mm. The FEINova Nano SEM 400 field emission scanning electron microscope was used to observe the condition of the interconnection parts of the large pore cavities and observe the diameter of the interconnection parts of the large pore cavities and other large pore cavities. Observed statistical results show that the interconnection of pore cavities of each level and the connection between pore cavities of different level are good, and the interconnection parts of the large pore cavities are uniform in size and shape, and the average diameter of the interconnection parts is 25 μm.

The material can be used as a photocatalytic material, and the large pore cavities and the interconnection parts having uniform size and shape and an average diameter of 50% of the average diameter of the large pore cavities introduce more light into the interior of the photocatalytic material, thereby significantly improving the photocatalytic activity thereof.

Embodiment 2

The porous material of the present embodiment is a porous aluminium oxide with a secondary pore structure, and the structure is similar to that of Embodiment 1. The large pore cavities have an average pore size of 850 μm and the small pore cavities have an average pore size of 620 nm, and the preparation and test methods are similar to those in Embodiment 1. The difference is that a pore-forming agent unit consists of four pore-forming agent particles and the pore-forming agent particle is hexahedral, and four pore-forming agent particles are connected by three connecting rods as a whole. The average diameter of the interconnection parts between the large pore cavities was measured to be 392 μm.

The material can be used as a filter material, and the upper limit value of the size of filterable material particles is not more than 423 μm. As the interconnection parts are uniform and the hierarchical filtration is adopted, the filtration efficiency is remarkably improved.

Embodiment 3

The porous material of the present embodiment is a porous tantalum with a tertiary pore structure. The cavity walls of the first-level pore cavities (i.e. the largest-level pore cavities) with uniform distribution and mutual connection are provided with the second-level pore cavities with uniform distribution and mutual connection, and the cavity walls of the second-level pore cavities are provided with the third-level pore cavities (i.e. the smallest-level pore cavities) with uniform distribution and mutual connection, and pore cavities of the same level and pore cavities of different levels are both interconnected with each other, and the interconnection is a three-dimensional interconnection. The porous tantalum of each level is a continuous structure, and the maximum outer boundary of the porous tantalum of each level is equivalent to a space boundary of an entire material body. The third-level pore cavities have an average pore size of 230 μm, the second-level pore cavities have an average pore size of 140 μm, and the first-size pore cavity has an average pore size of 680 μm.

The preparation method is as follows:

(1) Material preparation

A tantalum powder with an average particle size of 40 nm is used as a raw material, and urea with an average particle size of 283 nm is used as a pore-forming agent for the smallest-size pore cavities of the porous tantalum to be prepared, and stearic acid with an average particle size of 283 nm is used as a binder. The tantalum powder, the urea, the stearic acid and the distilled water are formulated into a slurry according to a volume ratio of 1:5:1:13.

The polyester foam with a pore size of 650 μm to 920 μm is used. The slurry is uniformly filled into the polyester foam by a foam impregnation method to form a green body, and the green body is dried and crushed to obtain the mixed grains with a grain size of 30 μm to 50 μm containing the raw material, the pore-forming agent and the polyester foam.

(2) A pore-forming agent having a structure as shown in FIG. 2 is prepared from polylactic acid. A pore-forming agent unit is a three-dimensional integral structure formed by connecting four pore-forming agent particles through four connecting rods, and each particle is spherical with a diameter of 176 μm. Each pore-forming particle is provided with four connecting rods having a cylindrical shape, a diameter of 83 μm and a length of 71 μm. The pore-forming agent is uniformly mixed with the mixed grains according to a volume ratio of 4:1, and then uniformly poured into a three-dimensionally connected polyester foam with an average strut diameter of 810 μm and an average pore size of 720 μm, then the polyester foam is placed in a closed mould to be pressed into a compact green body.

(3) The compact green body is vacuum sintered, and the sintered green body is subjected to a conventional subsequent treatment according to a tantalum material process to obtain porous tantalum with tertiary pores.

Tests using a test method similar to that of Embodiment 1 indicate that the interconnection of pores of same level and the interconnection between pores of different levels are good, and the interconnection parts of the second-level pore cavities are uniform in size and shape, and the average diameter of the interconnection parts is 67 μm.

The porous tantalum can be used as a bone implant material. Since the second-size pore cavities are used for cell colonization, the interconnection parts with the uniform size and shape and their size are particularly favorable for cell growth and migration; the third-size pore cavities can be used to load drugs and growth factors, and facilitate cell adhesion, differentiation and migration. The first-size pore cavities can be used for blood vessel and tissue ingrowth, thereby meeting various functional requirements of bone implant materials.

Embodiment 4

The porous material of the present embodiment is a porous niobium with a tertiary pore structure, and the structure is similar to that of Embodiment 3. The third-size pore cavities have an average pore size of 410 nm, the second-size pore cavities have an average pore size of 135 μm, and the first-size pore cavities have an average pore size of 620 μm.

The preparation method is similar to that of Embodiment 3. The difference is that in the preparation method step (2), a pore-forming agent unit is a three-dimensional integral structure formed by connecting six pore-forming agent particles through six connecting rods, each particle is spherical with two spherical segments, and the area of the spherical segment is the same as the cross-sectional area of the connecting rod perpendicular to the axial direction. The polyester foam is not used for the polymer support in the step (2), instead, three-dimensional network structure formed by connecting polylactic acid spherical particles through connecting rods is used. A particle size of polylactic acid spherical particle is 730 μm, a diameter of the connecting rod is 370 μm, and a length of the connecting rod is 240 μm.

Tests indicate that the size and shape of the interconnection parts between the second-size pore cavities, between the first-level pore cavities, and between the second-size pore cavities and the first second-size pore cavities were uniform. The average diameters of the interconnection parts between the second-size pore cavities and between the second-size pore cavities and the first second-size pore cavities were 62 μm. The average diameters of the interconnection parts between the first-size pore cavities were 297 μm.

The porous niobium can be used as a bone implant material, and its performance is similar to that of the porous tantalum in Embodiment 3. As the interconnection parts of the first-size pore cavities are also effectively controlled, the structure is better than that of the porous tantalum in Embodiment 3.

The invention claimed is:

1. A porous material, comprising a material body, wherein the material body comprises pore cavities graded by pore size of the material and cavity walls surrounding the pore cavities, and lower-level pore cavities are arranged on cavity walls of upper-level pore cavities formed by surrounding a three-dimensional space; wherein pore cavities of same level are interconnected with each other, and pore cavities of different levels are also interconnected with each other, wherein the porous material has a tertiary pore structure, the third-level pore cavities have an average pore size of 230-410 nm, the second-level pore cavities have an average pore size of 135-140 μm, and the first-level pore cavity has an average pore size of 620-680 μm; and a size and shape of interconnection parts between the second-level pore cavities is consistent with a size and shape of interconnection parts between the second-level pore cavities and the first-level pore cavities, and an average value of an equivalent diameter of the interconnection parts between the second-level pore cavities is larger than 45% of an average value of a diameter of second-level pore cavities.

2. The porous material according to claim 1, wherein porous material of each level in the material body is a continuous structure.

3. The porous material according to claim 2, wherein a maximum outer boundary of the porous material of each level is equivalent to a space boundary of an entire material body.

4. The porous material according to claim 1, wherein the porous material of each level in the material body has its own physicochemical properties.

5. The porous material according to claim 1, wherein pore cavities and interconnection parts in each level are uniform in size and evenly distributed in the material body.

6. A preparation method of the porous material according to claim 1, comprising:
(1) material preparation mixing a raw material powder with a pore-forming agent used for preparing a smallest level pore cavities to formulate into a slurry;
uniformly filling the slurry into a polymer material support to form a green body, drying and crushing the green body to form mixed grains comprising the raw material, the pore-forming agent and a material of the polymer material support;
(2) uniformly mixing the mixed grains obtained as described above with a pore-forming agent used for preparing a previous level pore cavities larger than the smallest level pore cavities of the porous material to form a compact green body;
(3) vacuum sintering the compact green body; performing a conventional subsequent treatment on the sintered green body according to a raw material process of the porous material to obtain a porous material;
wherein pore-forming agent of at least one level of pore cavities has the following structure: at least three connecting rods are arranged on any one of pore-forming agent particles, and at least two of the three connecting rods are respectively connected with other pore-forming agent particles, and a diameter of the connecting rod is larger than 45% of a diameter of the pore forming agent particle, and a length of the connecting rod is more than 10% of a diameter of the pore-forming agent particle.

7. The preparation method of the porous material according to claim 6, wherein a structure of the pore-forming agent particles of at least one level of pore cavities connected by the connecting rods is in a following manner: at least four pore-forming agent particles are connected by the connecting rods to form a three-dimensional integral structure.

8. The preparation method of the porous material according to claim 6, wherein a shape of the pore-forming agent particle is a polyhedron with at least five surfaces or a spherical having at least two spherical segments; an area of any surface of the polyhedron or an area of the spherical segment is equivalent to a cross-sectional area of the connecting rod perpendicular to an axial direction.

9. The preparation method of the porous material according to claim 6, wherein before preparing the compact green body, the mixed grains are uniformly mixed with a pore-forming agent used for preparing pore cavities one level larger than the smallest level pore cavities of the porous materials, and then uniformly poured into the polymer material support; a pore size of the polymeric material frame is larger than a particle size of the mixed grains and a particle size of the pore-forming agent; an edge of the polymeric material frame is used as a pore-forming agent for pore cavities two levels larger than the smallest level pore cavities of the porous materials.

10. The preparation method of the porous material according to claim 6, wherein pores of the polymer material frame are three-dimensionally interconnected.

11. The porous material according to claim 2, wherein the porous material of each level in the material body has its own physicochemical properties.

12. The porous material according to claim 3, wherein the porous material of each level in the material body has its own physicochemical properties.

13. The porous material according to claim 2, wherein pore cavities and interconnection parts in each level are uniform in size and evenly distributed in the material body.

14. The porous material according to claim 3, wherein pore cavities and interconnection parts in each level are uniform in size and evenly distributed in the material body.

15. The porous material according to claim 4, wherein pore cavities and interconnection parts in each level are uniform in size and evenly distributed in the material body.

16. The preparation method of the porous material according to claim 7, wherein a shape of the pore-forming agent particle is a polyhedron with at least five surfaces or a spherical having at least two spherical segments; an area of any surface of the polyhedron or an area of the spherical segment is equivalent to a cross-sectional area of the connecting rod perpendicular to an axial direction.

17. The preparation method of the porous material according to claim 7, wherein before preparing the compact green body, the mixed grains are uniformly mixed with a pore-forming agent used for preparing pore cavities one level larger than the smallest level pore cavities of the porous materials, and then uniformly poured into the polymer material support; a pore size of the polymeric material frame is larger than a particle size of the mixed grains and a particle size of the pore-forming agent; an edge of the polymeric material frame is used as a pore-forming agent for pore cavities two levels larger than the smallest level pore cavities of the porous materials.

18. The preparation method of the porous material according to claim 7, wherein pores of the polymer material frame are three-dimensionally interconnected.

19. The preparation method of the porous material according to claim 8, wherein pores of the polymer material frame are three-dimensionally interconnected.

20. The preparation method of the porous material according to claim 9, wherein pores of the polymer material frame are three-dimensionally interconnected.

* * * * *